United States Patent [19]

Hirahara et al.

[11] Patent Number: 4,814,366

[45] Date of Patent: Mar. 21, 1989

[54] THERMOPLASTIC POLYESTER RESIN COMPOSITION

[75] Inventors: Takuji Hirahara, Yokohama; Takashi Nakamura, Sagamihara; Yoshiko Aoyama, Yokohama; Shuichi Maeda, Saitama, all of Japan

[73] Assignee: Mitsubishi Chemical Industries Limited, Tokyo, Japan

[21] Appl. No.: 104,223

[22] Filed: Oct. 5, 1987

[30] Foreign Application Priority Data

Oct. 7, 1986 [JP] Japan .................. 61-238686

[51] Int. Cl.$^4$ .......................... C08K 5/34; C08K 5/15; C08K 5/12

[52] U.S. Cl. .................................. 524/89; 524/109; 524/112; 524/285; 528/289; 528/292; 528/296; 528/308.2

[58] Field of Search .................. 548/423, 425; 524/89, 524/109, 112, 285, 293; 528/289, 292, 296, 308.2; 106/176; 8/574, 518, 519, 490; 549/235; 560/80

[56] References Cited

U.S. PATENT DOCUMENTS

| 2,912,442 | 11/1959 | Webster | 549/235 |
|---|---|---|---|
| 3,052,636 | 9/1962 | Strobel et al. | 524/205 |
| 3,239,363 | 3/1966 | Burdge | 524/293 |
| 3,255,235 | 6/1966 | Coran | 560/80 |
| 3,386,795 | 6/1968 | Caldwell et al. | 524/89 |
| 3,553,157 | 5/1968 | Dijkstra et al. | 528/408.2 |
| 3,755,152 | 11/1973 | Jacoby et al. | 528/296 |
| 3,954,840 | 5/1976 | Yamashita et al. | 560/80 |

FOREIGN PATENT DOCUMENTS

| 0156966 | 10/1985 | European Pat. Off. . |
| 1769425 | 8/1971 | Fed. Rep. of Germany . |
| 48-2213 | 1/1973 | Japan . |
| 48-32421 | 10/1973 | Japan . |
| 49-30676 | 3/1974 | Japan . |
| 51-54639 | 5/1976 | Japan . |
| 53-98242 | 8/1978 | Japan . |
| 53-124556 | 10/1978 | Japan . |
| 703612 | 12/1979 | U.S.S.R. . |
| 728550 | 4/1955 | United Kingdom . |
| 1124536 | 8/1968 | United Kingdom . |
| 1147232 | 4/1969 | United Kingdom . |

OTHER PUBLICATIONS

Patent Abstracts of Japan, vol. 9, No. 233 (C-304)(1956), Sep. 19, 1985 of Japanese Patent 60-92333 published 5-23-85.

CA 85 95209s (1976).

Anthony Davis and David Sims: *Weathering of Polymers*, pp. 112–136.

*Primary Examiner*—Veronica P. Hoke
*Attorney, Agent, or Firm*—Oblon, Fisher, Spivak, McClelland & Maier

[57] ABSTRACT

Disclosed herein is a thermoplastic polyester resin composition comprising a thermoplastic polyester resin and an amount effective in ultraviolet screening of at least one of naphthalenetetracarboxylic acids, acid anhydrides thereof, imides thereof and esters thereof.

14 Claims, 2 Drawing Sheets

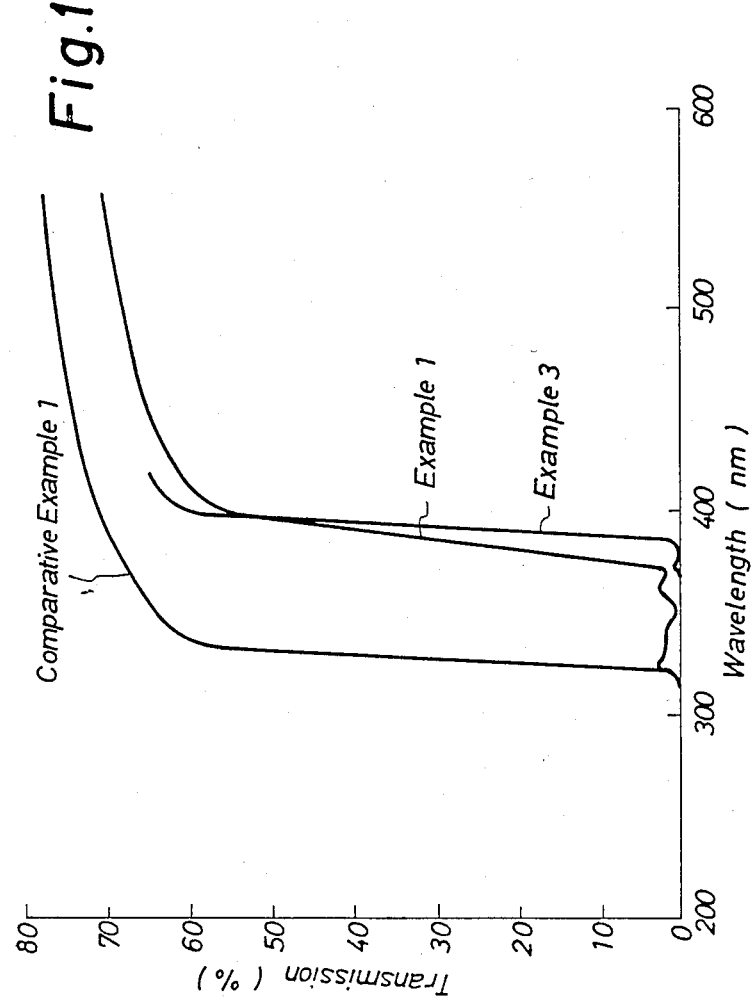

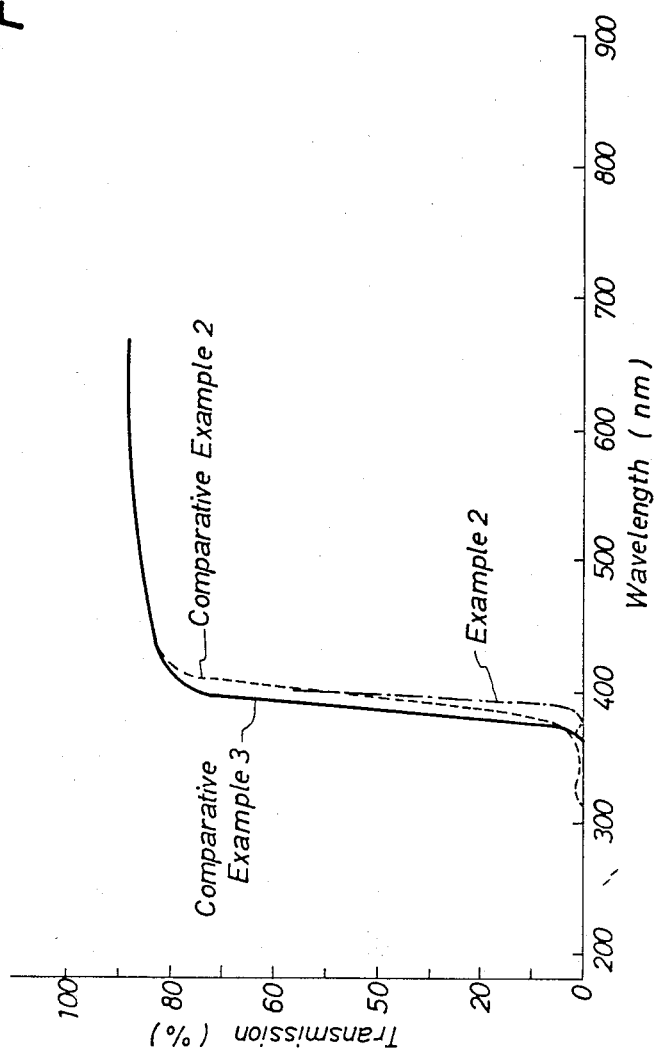

THERMOPLASTIC POLYESTER RESIN COMPOSITION

BACKGROUND OF THE INVENTION

The present invention relates to a thermoplastic polyester resin composition. More in detail, the present invention relates to a thermoplastic polyester resin composition excellent in ultraviolet screening, comprising a thermoplastic polyester resin and an amount effective in ultraviolet screening of at least one of naphthalenetetracarboxylic acids, acid anhydrides thereof, imides thereof and esters thereof.

According to the excellent mechanical properties and chemical specificities of polyester represented by polyethylene terephthalate, the polyester has been broadly used for fibers, films, etc. Moreover, according to the excellent transparency, the gas-barrier property, the safety and sanitation properties of the polyester, the suitablity of the polyester as the container of carbonated-beverage drinks, fruit juice drinks, liquid seasonings, edible oils, liquors and wines has attracted an attention in recent years. Still more, from the viewpoint of energy-saving and a countermeasure for earthquake, as the new use of the polyester film, the use of the polyester as a film sticked to window for the heat-radiation screening or the prevention of glass scattering has shown the rapid development. Besides, in the field of agriculture and horticulture, the demand for providing a transparent film selectively screening ultraviolet light (UV light) of a specified wavelength range is strong with the object of growth-promotion and increase of harvest of the crops for instance, refer to Japanese Patent Application Laid-Open (KOKAI) No. 53-98242 (1978).

Although these containers and films of polyester are excellent in screening UV light up to 320 nm wavelength range, they are almost transparent to UV light or they almost transmit UV light above the longer wavelength range and visible radiation. For instance, in the case where an edible oil or a liquid seasoning such as sweet sake, dressing, etc. is filled in a container made of polyester and the container is preserved for a few months, there are many cases where the deterioration of the content of the container, for instance, a delicate change of the colour, taste and flavour, occurs gradually according to the preserving conditions although there are specific cases according to the respective foodstuff filled in the container and to the preserving conditions.

Although the deterioration of the content of the container originates in the external causes such as oxygen, heat, light, particularly ultraviolet, microorganisms, etc., in the case of the polyester container, since it is relatively excellent in oxygen gas-barrier property if it is possible to further improve the ultraviolet screening property of the polyester container, it becomes possible to prevent remarkably the deterioration of the content even for a long term preservation.

Furthermore, in the case of using the polyester film for sticking to window, for instance, when the UV light in the sun light is transmitted, the discoloration of the fixtures within the house such as furnitures, books, household implements, etc. is caused and accordingly, it is necessary to prevent the transmittance to the minimum or to completely screen the UV light. In the case of mulching cultivation in agriculture and horticulture, it has been known to be possible that the growth of many useful plants is promoted, the crops of high quality can be harvested in an early season and in a large amount by mulching with the transparent coating material which screens substantially the transmittance of the UV light of a wavelength of not longer than 370 nm for instance, refer to Japanese Patent Application Laid-Open (KOKAI) No. 53-124556 (1978).

At present, in the fields, an ultraviolet absorbing agent is generally used and added to the polyester for this purpose. However, since the ultraviolet absorbing agent is generally expensive and the adding step is complicated, and moreover, such an ultraviolet absorbing agent is large in sublimation generally and there are many agents of poor in heat-stability, there are cases of causing troubles in the adding step and at the time of mold-processing, and there is a fear of moving the agent to the content of the container in the case where such an agent is used in the foodstuff container and the packaging of foodstuff. Namely, the use of such an ultraviolet absorbing agent is not necessarily favorable.

As a result of the present inventors' earnest studies on the polyester resin composition which meets with the above-mentioned object, it has been found that a polyester resin composition comprising a thermoplastic polyester resin and an amount effective in ultraviolet screening of at least one of naphthalenetetracarboxylic acids, acid anhydrides thereof, imides thereof and esters thereof, can sufficiently screen the UV light in the longer wavelength range as well as the UV light in the shorter wavelength range, and on the basis of the finding, the present invention have been attained.

SUMMARY OF THE INVENTION

In a first aspect of the present invention, there is provided a thermoplastic polyester resin composition comprising a thermoplastic polyester resin and an amount effective in ultraviolet screening of at least one of naphthalenetetracarboxylic acids, acid anhydrides thereof, imides thereof and esters thereof.

In a second aspect of the present invention, there is provided a thermoplastic polyester resin composition comprising a thermoplastic polyester resin, an amount effective in ultraviolet screening of at least one of naphthalenetetracarboxylic acids, acid anhydrides thereof, imides thereof and esters thereof, and a naphthalenedicarboxylic acid or a derivative thereof of not less than 0.001 part by weight per 100 parts by weight of said thermoplastic polyester resin.

In a third aspect of the present invention, there is provided a container formed from the thermoplastic polyester resin composition of the first aspect or the second aspect.

In a fourth aspect of the present invention, there is provided a film or sheet formed from the thermoplastic polyester resin composition of the first aspect or the second aspect.

In a fifth aspect of the present invention, there is provided a bottle formed from the thermoplastic polyester resin composition of the first aspect or the second aspect.

BRIEF EXPLANATION OF THE DRAWINGS

Of the attached drawings,

FIG. 1 shows a light transmissivity of the thermoplastic polyester resin compositions obtained in Examples 1 and 3 and Comparative Example 1, and FIG. 2 shows a light transmissivity of the thermoplastic polyester resin compositions obtained in Example 2 and Comparative Examples 2 and 3.

DETAILED DESCRIPTION OF THE INVENTION

The heart of the present invention lies in a thermoplastic polyester resin composition produced by adding at least one of naphthalenetetracarboxylic acids, the acid anhydrides thereof, the imides thereof and the esters thereof in an amount effective in ultraviolet screening to a thermoplastic polyester resin.

As the compound added to the polyester resin according to the present invention, a naphthalenetetracarboxylic acid, an acid anhydride thereof, an imide thereof or an ester thereof which has a framework composed of a naphthalenetetracarboxylic acid moiety is used.

As the naphthalenetetracarboxylic acid, naphthalene-1,4,5,8-tetracarboxylic acid, naphthalene-1,3,5,7-tetracarboxylic acid, naphthalene-1,2,5,6-tetracarboxylic acid, naphthalene-2,3,6,7-tetracarboxylic acid, naphthalene-1,3,6,8-tetracarboxylic acid, naphthalene-1,4,6,7-tetracarboxylic acid, naphthalene-1,2,4,5-tetracarboxylic acid, naphthalene-1,3,4,5-tetracarboxylic acid, naphthalene-1,2,3,4-tetracarboxylic acid, etc. may be exemplified, and an acid anhydride of the above-mentioned acids may be used for the purpose of the present invention. Of the above-mentioned compounds, naphthalene-1,4,5,8-tetracarboxylic acid or the acid anhydride thereof is preferable.

As the ester of the naphthalenetetracarboxylic acid, various esters may be used, however, an alkyl ester thereof such as methyl ester, ethyl ester, propyl ester, butyl ester, etc. is preferable. For instance, tetramethyl naphthalene-1,4,5,8-tetracarboxylate, tetraethyl naphthalene-1,4,5,8-tetracarboxylate, tetrapropyl naphthalene-1,4,5,8-tetracarboxylate, tetrabutyl naphthalene-1,4,5,8-tetracarboxylate, tetramethyl naphthalene-1,3,5,7-tetracarboxylate, tetramethyl naphthalene-1,3,6,8-tetracarboxylate, etc. may be exemplified. Furthermore, the carboxyl groups respectively situating the adjacent positions on the naphthalene ring, such as in naphthalene-1,3,6,8-tetracarboxylic acid, may have formed an anhydride ring.

Still more, a compound having both the anhydride ring and the ester bond, such as 3,6-dimethyl ester of naphthalene-tetracarboxylic acid 1,8-anhydride may be used for the purpose of the present invention.

As the imide compound, any imides of naphthalenetetracarboxylic acid may be used, and such an imide can be produced by reacting naphthalene-1,4,5,8-tetracarboxylic acid or an acid derivative thereof with ammonia; an aliphatic aminocarboxylic acid such as glycine, alanine, valine, ε-aminocaproic acid, etc.; an aminoalcohol; an aromatic aminocarboxylic acid such as o-aminobenzoic acid, m-aminobenzoic acid and p-aminobenzoic acid and a diamine.

Since the imide compound, particularly the diimide compound is excellent in heat-resistance as compared to the afore-mentioned tetracarboxylic acids, the acid anhydrides thereof or the esters thereof, the imide compound, particularly the diimide compound is particularly preferable.

Those which are preferable as the diimide compounds are diimide compounds of naphthalene-1,4,5,8-tetracarboxylic acid, which are represented by the following formula(1):

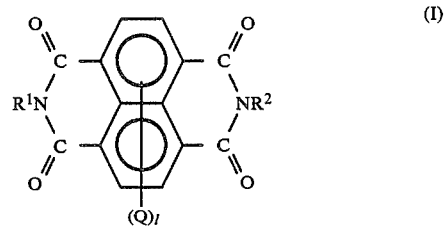

wherein $R^1$ and $R^2$ may be the same or different from each other and respectively represent hydrogen atom, a halogen atom, a hydroxyl group, an alkyl group of 1–10 carbon atoms which may be substituted, an alkenyl group of 2–10 carbon atom which may be substituted, an aryl group of 6–10 carbon atoms which may be substituted, an aralkyl group of 7–10 carbon atoms which may be substituted or an alkylaralkyl group of 8–20 carbon atoms which may be substituted; Q represents halogen atom, a hydroxyl group, an amino group, a nitro group, a cyano group, a carboxyl group, a sulfonic acid group or a salt thereof, an alkyl group of 1–10 carbon atoms which may be substituted, an alkoxy group of 1–10 carbon atoms which may be substituted, an alkenyl group of 2–10 carbon atoms which may be substituted, an aryl group of 6–10 carbon atoms which may be substituted, an aralkyl group of 7–10 carbon atoms which may be substituted or an alkylaralkyl group of 8–20 carbon atoms which may be substituted and $l$ is an integer of from 0 to 4.

Among the diimide compounds of the naphthalene-1,4,5,8-tetracarboxylic acid, naphthalene-1,4,5,8-tetracarboxydiimides represented by the formula (I) in which $R^1$ and $R^2$ respectively represent a carboxyl group or a lower (1–4 carbon atoms) alkyl group substituted by hydroxyl group(s) and $l$ is zero are preferable.

In the concrete, naphthalene-1,4,5,8-tetracarboxydiimide represented by the following formula:

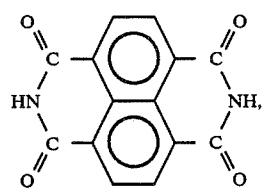

N,N'-bis(α-carboxymethyl)-naphthalene-1,4,5,8-tetracarboxydiimide represented by the following formula:

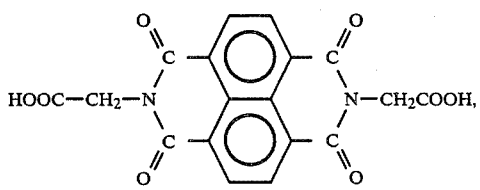

N,N'-bis(α-biscarboxymethyl)-2-chloronaphthalene-1,4,5,8-tetracarboxydiimide represented by the following formula:

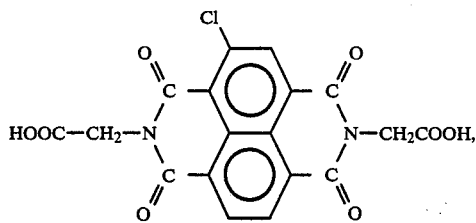

N,N'-bis(β-carboxyethyl)-naphthalene-1,4,5,8-tetracarboxydiimide represented by the following formula:

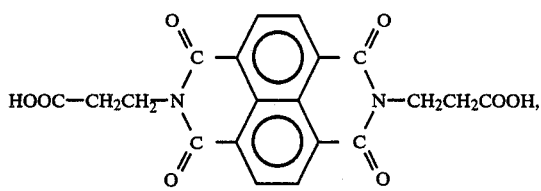

N,N'-bis(α-carboxy-γ-methylbutyl)-naphthalene-1,4,5,8-tetracarboxydiimide represented by the following formula:

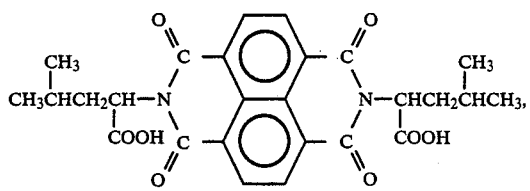

N,N'-bis(α-carboxy-γmethylpentyl)-naphthalene-1,4,5,8-tetracarboxydiimide represented by the following formula:

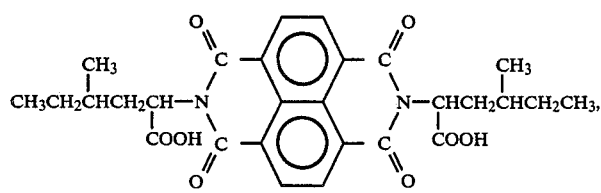

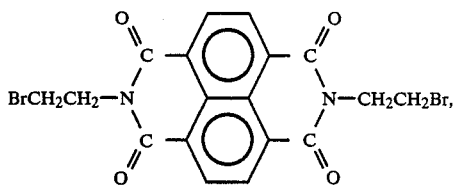

N,N'-bis(benzyl)-naphthalene-1,4,5,8-tetracarboxydiimide represented by the following formula:

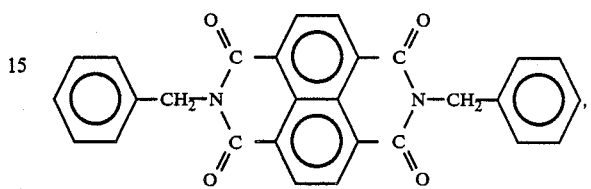

N,N'-bis(carboxyphenyl)-naphthalene-1,4,5,8-tetracarboxydiimide represented by the following formula:

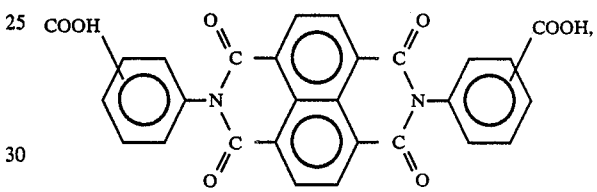

N,N'-bis(carboxytolyl)-naphthalene-1,4,5,8-tertracarboxydiimide represented by the following formula:

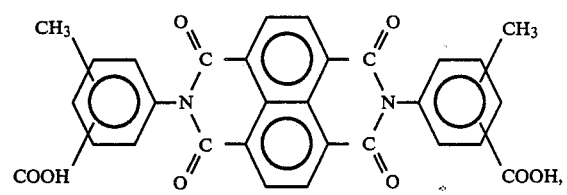

N,N'-bis(α-hydroxyethyl)-naphthalene-1,4,5,8-tetracarboxydiimide represented by the following formula:

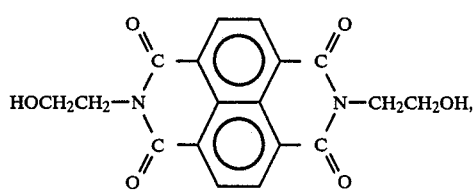

N,N'-bis(β-bromoethyl)-naphthalene-1,4,5,8-tetracarboxydiimide represented by the following formula:

N,N'-bis(n-butyl)-naphthalene-1,4,5,8-tetracarboxydiimide presented by the following formula:

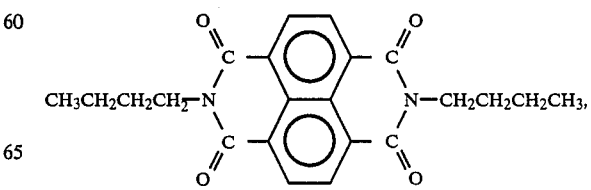

N,N'-bis(hydroxy)-naphthalene-1,4,5,8-tetracarboxydiimide represented by the following formula:

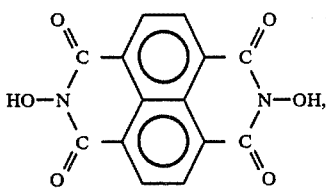

etc. may be exemplified as the diimide compound of the present invention.

The amount of addition of naphthalenetetracarboxylic acid, the acid anhydride thereof, the imide thereof or the ester thereof, which is effective in the ultraviolet screening is generally 0.001 to 20 part by weight per 100 parts by weight of the thermoplastic polyester resin. In the case where the amount of addition is less than 0.001 part by weight, an efficient effect of the ultraviolet screening cannot be obtained even by addition of a suitable amount of the naphthalenedicarboxylic acid or a derivative thereof described later. The preferable amount of the addition of the naphthalenetetracarboxylic acid, the acid anhydride thereof, the imide thereof or the ester thereof is from 0.005 to 10 parts by weight per 100 parts by weight of the thermoplastic polyester resin.

In the present invention, in order to develop the effect of the ultraviolet screening furthermore effectively, at least one of naphthalenedicarboxylic acid derivatives represented by the following formula(II) or formula(III) is preferably used in combination with naphthalenetetracarboxylic acid, the acid anhydride thereof, the imide thereof or the ester thereof.

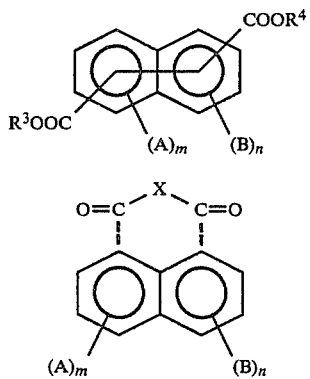

wherein X is an oxygen atom or a group $NR^5$ wherein $R^5$ is the same as the afore-mentioned $R^1$ and $R^2$; $R^3$ and $R^4$ may be the same or different from each other and represent respectively a hydrogen atom, a halogen atom, an alkyl group of 1-10 carbon atoms which may be substituted, an alkenyl group of 2-10 carbon atoms which may be substituted, an aryl group of 6-10 carbon atoms which may be substituted, an aralkyl group of 7-10 carbon atoms which may be substituted or an alkylaralkyl group of 8-20 carbon atoms which may be substituted; A and B may be the same or different from each other and represent respectively a halogen atom, a hydroxyl group, an amino group, a nitro group, a cyano group, a sulfonic acid group or a metal salt thereof, a carboxyl group, an alkyl group of 1-10 carbon atoms which may be substituted, an alkoxy group of 1-10 carbon atoms which may be substituted, an alkenyl group of 2-10 carbon atoms which may be substituted, an aryl group of 6-10 carbon atoms which may be substituted, an aralkyl group of 7-10 carbon atoms which may be substituted or an alkylaralkyl group of 8-20 carbon atoms which may be substituted; m and n are respectively an integer of from 0 to 3 and m+n is an integer of from 0 to 6.

Still more, the acid anhydride group or the imide group represented by —C(=O)—X—C(=O)— forms a ring at the 1,8-position, the 2,3-position or the 3,4-position of the naphthalene ring.

Among of the naphthalenedicarboxylic acid and the derivative thereof, represented by the formula (II) or (III), a compound wherein m and n are respectively zero, $R^3$ and $R^4$ are respectively a hydrogen atom or lower (1-4 carbon atoms) alkyl group and $R^5$ is a hydrogen atom, a hydroxyl group or an alkyl group of 1-4 carbon atoms is preferable.

As the example of the naphthalenedicarboxylic acid derivatives, the structural isomers of dicarboxylic acid such as 2,6-naphthalenedicarboxylic acid, 2,7-naphthalenedicarboxylic acid, 1,8-naphthalenedicarboxylic acid, 1,5-naphthalenedicarboxylic acid or 2,3-naphthalenedicarboxylic acid; the acid anhydrides thereof; the esters thereof; the aromatic ring substituted compounds thereof by halogen, $NO_2$, $NH_2$, CN, $SO_3H$ and COOH; the metal salts thereof; and the imides produced by the reaction of one of these naphthalenedicarboxylic acid with ammonia, amine, aminocarboxylic acid and aminoalcohol may be exemplified.

In the concrete, as the 2,3-substituted compounds, naphthalene-2,3-dicarboxylic acid and the derivatives thereof such as the esters of naphthalene-2,3-dicarboxylic acid such as dimethyl ester, diethyl ester, dipropyl ester and dibutyl ester; naphthalene-2,3-dicarboxylic acid anhydride; naphthalene-2,3-dicarboxyimide; naphthalene-2,3-dicarboxy(α-carboxymethyl)imide; naphthalene-2,3-dicarboxy(α-carboxyethyl)imide; naphthalene-2,3-dicarboxy-(o-carboxyphenyl)imide; naphthalene-2,3-dicarboxy-(m-carboxyphenyl)imide; naphthalene-2,3-dicarboxy-(p-carboxyphenyl)imide, naphthalene-2,3-dicarboxy(α-bromomethyl)imide, naphthalene-2,3-dicarboxy (α-hydroxymethyl)imide; the 1,4-, 1,5-, 1,8-, 2,6- and 2,7-structural isomers thereof; and further, the aromatic ring substituted compounds of the above-mentioned compounds by hydroxyl group, chloro group, bromo group, methoxy group, ethoxy group, cyano group, amino group, nitro group, sulfonyl group or carboxyl group in number of 1 to 6 may be exemplified, and for developing the combining effect, it is important that the compound used in combination with naphthalenetetracarboxylic acid or the derivative thereof has the framework composed of naphthalenedicarboxylic acid moiety.

The particularly preferable compound of naphthalenedicarboxylic acids is naphthalene-2,6-dicarboxylic acid, naphthalene-2,7-dicarboxylic acid, naphthalene-2,3-dicarboxylic acid, naphthalene-1,4-dicarboxylic acid or an ester of these dicarboxylic acids, and the lower (1-4 carbon atoms) alkyl ester of these dicarboxylic acids.

In the case where such a naphthalenedicarboxylic acid or a derivative thereof is used in combination with the afore-mentioned naphthalenetetracarboxylic acid or a derivative thereof, an amount of not less than 0.001 part by weight of the naphthalenedicarboxylic acid or the derivative thereof is added to 100 parts by weight of the thermoplastic polyester resin. In the case where the amount is less than 0.001 part by weight, the further improvement of the ultraviolet screening is not seen. The preferable amount of addition of the naphthalenedicarboxylic acid or the derivative thereof is from 0.01 to 10 parts by weight.

The compound having the framework composed of naphthalenetetracarboxylic acid and the compound having the framework composed of naphthalenedicarboxylic acid may be added in any step of the production of the polyester, and the above-mentioned compounds added in any step before the mold-processing can develop the effect of the ultraviolet screening as the same extent as above.

Namely, the compound having the framework composed of naphthalenetetracarboxylic acid and the compound having the framework composed of naphthalenedicarboxylic acid may be added in any step until the molding of the polyester is finished, for instance, before the polycondensation, during the polycondensation, after the polycondensation, in the powdery or granular state of the polyester, during the molding step of the polyester, etc.

The thermoplastic polyester in the present invention is the polyester obtained from at least one species of dicarboxylic acid component represented by the aromatic dicarboxylic acid such as terephthalic acid, isophthalic acid, phthalic acid, naphthalenedicarboxylic acid, diphenyl ether dicarboxylic acid, diphenylsulfonedicarboxylic acid, etc., and esters thereof; the cycloaliphatic dicarboxylic acid which is the aromatic ring hydrogenated compound of the above-mentioned aromatic dicarboxylic acid, such as hexahydroterephthalic acid, and esters thereof; the aliphatic dicarboxylic acid such as succinic acid, adipic acid, sebacic acid, azelaic acid, etc., and esters thereof; and the unsaturated dicarboxylic acid such as fumalic acid and 4-carboxycinnamic acid, and esters thereof, and glycol mainly composed of ethylene glycol. Particularly, as the thermoplastic polyester in the present invention polyethylene terephthalate is preferable, however, these polyesters may be the product prepared by copolymerizing, as the acid component, the above-mentioned dicarboxylic acid as the third component other than terephthalic acid in an amount of not more than 20 mol %.

Still more, this polyester may be the product prepared by copolymerizing, as the glycol component and the third component other than ethylene glycol, an aliphatic glycol such as diethylene glycol, trimethylene glycol, tetramethylene glycol and neopentyl glycol; a cycloaliphatic glycol such as cyclohexane dimethanol; a bisphenol derivative such as 2,2-bis(4'-$\beta$-hydroxyethoxyphenyl)propane and bis-(4'-$\beta$-hydroxyethoxyphenyl)-sulfone and further the polyethylene glycol, polytetramethylene glycol represented by the formula: $\{(CH_2)_n O\}_m$ (wherein n is an integer of 1 to 6 and m is an integer of not less than 4) in an amount of not more than 20 mol %, and may be the polyester formed by copolymerizing an oxyacid component such as hydroxybenzoic acid, etc. Besides, so far as the polyester is substantially linear polymer, the polyester may be produced by copolymerizing a polyfunctional compound not less than trifunctional such as pentaerythritol, trimethylolpropane, trimellitic acid, trimesic acid, pyrromellitic acid, etc. and a monofunctional compound such as o-benzoylbenzoic acid. Also, in addition to the above-mentioned polyester, the material produced by blending the other thermoplastic resin such as polybutylene terephthalate, polyethylene naphthalate, polyester elastomer, polycarbonate, etc. may be used as the polyester according to the present invention.

It is preferable that the limiting viscosity of the polyester used in the present invention is not smaller than 0.5, preferably not smaller than 0.6. The viscosity of the polyester is, for instance, in the case of producing a molded hollow article, particularly important in the relationship to the method of molding. Particularly, in the case of obtaining a substantially nonoriented and molded hollow article by a blowing molding method, it is necessary to maintain the fluidity of the molten polyester at a level higher than a predetermined one for the prevention of drawdown although the level depends on the capacity of the blow moldings, and in that case, the polyester having a limiting viscosity of not smaller than 0.7, preferably not smaller than 0.8 is preferably used. Besides, in the method of draw and blow molding, in the extruding method wherein the film is obtained by stretching uniaxially or biaxially after forming a sheet, and in the injection molding method by which the variously shaped, and molded articles are obtained, a polymer of a relatively low viscosity as compared to the case of blow molding can be used, and in such cases, the polyester having the limiting viscosity of not smaller than 0.5, preferably not smaller than 0.6 is generally used. However, according to the physical properties required to the molded article, a polyester having a higher viscosity is used.

Still more, the polyester composition according to the present invention may be the material produced by adding a publicly known additive, for instance, stabilizer, mold release agent, antistatic agent, dispersing agent, dyestuff, pigment, etc., in any step of the production of the polyester. Such an additive may be added by the so-called method utilizing the master batch concentrates before mold-processing.

As the preferable dyestuff and pigments used in the present invention, titanium oxide, carbon black, phthalocyanine blue, phthalocyanine green, ultramarine, cobalt blue, titanium yellow, red iron oxide, burnt-umber, yellow oxide, etc. and heat-resistant and oil-soluble dyestuffs, in the concrete, oil-soluble dyestuffs having the framework composed of perinones moiety, quinophthalones moiety, anthrapyridones moiety, anthraquinones moiety, etc. may be exemplified. Particularly, the dyestuff and pigments having the structure which reacts to the functional group of the polyester and binds to the polyester chain is preferable. Still more, the dyestuff and pigment which are highly compatible with the polyester and show a sufficient heat-stability and colour-tone stability even at the temperature in the production and processing the polyester, are selected and added to the polyester. Particularly, in the case where the polyester composition is used as the material for producing a foodstuff-packaging container, the dyestuff and pigment which do not have any safety and sanitation problems are selected and added to the polyester.

The polyester resin composition according to the present invention may be processed into the molded articles as it is, or as occasion demands, the polyester resin composition is subjected to solid phase polymerization in a high vacuum or under an inert gas for the purposes of making the higher polymerization degree, the lower aldehyde and the lower oligomer, and the thus treated composition may be molded. Or else, the composition is subjected to the after-treatment such as solvent-extraction by xylene and chloroform, and then the thus treated composition may be used.

Besides, the polyester resin composition may be converted into a so-called master batch which is coloured to a desired colour of a high concentration of from a few times to 100 times, practically to 50 times of the predetermined concentration, and then the thus prepared master batch is diluted with the non-coloured polyester or the another-coloured polyester, or is used to develop another new colour tone. Thus, the polyester resin composition developing finally the desired colour tone may be used.

The thermoplastic polyester resin compositon excellent in the ultraviolet screening according to the present invention is formed into molded articles by melt-molding. At that time, all the melt-molding methods generally used in polyester are applicable to the thermoplastic polyester resin composition according to the present invention. More concretely, it is possible to obtain a molded hollow article which is excellent in the ultraviolet screening property, gas-barrier property, the toughness and the chemical-resistance, and has the glass-like transparency with a high class vision by the blowing method such as the ordinary blow molding method, the injection blow molding method, the cold-parison method in which the preliminarily molded material is biaxially stretched after reheating thereof, etc. The thus produced hollow article is particularly suitable as the container for the seasoning such as soyabean sauce, sauces, sweet sake, dressing, etc., edible oils, carbonated-beverage drinkings, fruit juice drinkings, sake, wine, cosmetics and medicines. Still more, the polyester resin composition is processed into a uniaxially or biaxially stretched film after once being processed into a sheet by extrusion molding or is processed into a laminated film together with another resin.

The thus prepared film is favorably used in particular as the packaging material for general foods, medicines, cosmetics, etc. and further as the material for sticking to window and as the mulching material used in agriculture and horticulture.

Besides, the polyester resin composition is favorably used as the material for producing variously molded articles by injection-molding.

The present invention will be explained more in detail while referring to the non-limitative Examples and Comparative Examples as follows.

Further, the "part" in Examples and Comparative Examples means the "part by weight".

The various measuring methods used in Examples and Comparative Examples are shown as follows.

Limiting Viscosity

The limiting viscosity of the resin was measured in a mixture of phenol and tetrachloroethane (50:50 by weight) at 30° C. and at a concentration of 1.0 g/dl.

Transmission rate of UV light

The transmission rate of UV light of the film was measured while following the ordinary method and using a spectral photometer (made by HITACHI Ltd., model No. 340).

Amount of acetaldehyde

The amount of acetaldehyde contained in the resin was measured by a high-sensitivity gaschromatograph after extracting the resin by water for 2 hours at 160° C.

Flow rate of an inert gas

The flow rate of an inert gas was shown by the amount of the gas transmitted through the film per unit time (hour) and per unit weight (kg) of the resin after converting into the volume (liter) at 25° C. under a pressure of 1 atom.

EXAMPLE 1

To 20,000 parts of bis($\beta$-hydroxyethyl) terephthalate contained in a polymerization vessel, 2 parts of germanium dioxide, 2 parts of ortho-phosphoric acid and 25 parts of dianhydride of naphthalene-1,4,5,8-tetracarboxylic acid were added, and the materials in the polymerization vessel were heated gradually from 260° C. with the simultaneous reducing of the inner pressure of the polymerization vessel gradually from ordinary pressure. The polymerization was carried out at 280° C. under a vacuum of 1 torr for 3 hours in total, thereby obtaining a transparent polyester composition of the limiting viscosity of 0.68.

After subjecting the thus obtained polyester composition to vacuum drying, the thus dried composition was molded into a sheet of a thickness of 350 $\mu$m by an extruder wherein the temperatures of cylinder and the nozzle were set at 275° C., the rotation of the screw was set at 40 rpm and the amount of extrusion was set at 80 g/min.

The thus produced film showed the respective light transmissivities at 370 nm and 380 nm of 2.8% and 15.0%. The chart of the transmissivity of the sheet is shown in FIG. 1.

Further, the thus dried resin composition was subjected continuously to injection-molding by an injection-molding machine (made by TOSHIBA corporation, IS-60B) wherein the temperatures of the cylinder and the nozzle were set at 275° C., the rotation of the screw was set at 100 rpm, the injection time was set at 10 sec and the temperature of water for cooling the metal mold was set at 10° C. for injecting the plates of 100 mm in length and width and 2 mm in thickness.

Even after injecting 500 plates, any adhered materials such as white powder were not observed on the thus injected plates.

EXAMPLE 2

The same reaction as in Example 1 was carried out except for adding 20 parts of N,N'-bis($\alpha$-carboxymethyl)naphthalene-1,4,5,8-tetracarboxydiimide and 100 parts of naphthalene-2,6-dicarboxylic acid instead of the dianhydride of naphthalene-1,4,5,8-tetracarboxylic acid in Example 1 to obtain a transparent polyester composition of a limiting viscosity of 0.66.

The light transmissivity of the sheet of 350 $\mu$m in thickness obtained by molding the thus produced polyester composition was 0.0% at 370 nm and 0.1% at 380 nm. The chart of the transmissivity of the sheet is shown in FIG. 2.

EXAMPLE 3

The same reaction as in Example 2 was repeated except for further adding 1.4 part of copper phthalocyanine and 2 parts of a reactive dyestuff of quinophthalones (made by MITSUBISHI Chemical Industries Ltd.) and as a result, a green coloured transparent polyester composition of a limiting viscosity of 0.60 was obtained. The light transmissivity of a sheet of 350 $\mu$m in thickness obtained by molding the thus produced polyester composition in the same manner as in Example 1 was 0.1% at 370 nm. The chart of the transmissivity of the film is shown in FIG. 1.

After crystallizing the surface of the chips of the thus produced polyester composition in a stirring crystallizer of the SOLID AIRE®-type (made by Bepex Corp., USA) at a resin temperature of 165° C., the thus treated chips were transferred to a stationary-bed solid-phase polymerization column and after drying the chips for 3 hours at from 120° to 160° C. under a flow of nitrogen gas of a flow rate of 30 liters/kg.hour, the thus dried chips were subjected to solid phase polymerization for 10 hours at the resin temperature of 210° C.

The limiting viscosity of the thus polymerized material in the solid phase was 0.76, and the material contained 3.1 ppm of acetaldehyde in the chip-form.

From the above-mentioned polyester composition, preforms were molded by an injection-molding machine (made by TOSHIBA Corporation, IS-60) wherein the temperature of the cylinder and the nozzle were set at 275° C., the rotation of the screw was set at 100 rpm, the injection time was set at 10 sec. and the temperature of water for cooling the metal mold was set at 10° C. By blow-molding the thus produced preform in a blow-molding machine (made by Corpoplast Corp., BMB-3) wherein the temperature of preheating furnace was set at 90° C., the blow pressure was set at 20 kg/cm² and the molding cycle was set at 10 sec, a bottle of 1 liter in capacity was obtained.

The UV light transmissivity of the part of the bottle of 350 μm in thickness was 0.1% at 370 nm and 380 nm.

COMPARATIVE EXAMPLE 1

Under the same conditions as in Example 1 while only adding 20 parts of germanium dioxide and 20 parts of ortho-phosphoric acid, a polyester composition of a limiting viscosity of 0.68 was obtained. The UV light transmissivity of the sheet of the thus obtained composition of 350 μm in thickness, which was produced in the same manner as in Example 1, was 68% at 370 nm and was 69% at 380 nm.

The chart of the transmissivity of the sheet is shown in FIG. 1.

EXAMPLE 4

After adding 0.15 part of N,N'-bis(α-carboxymethyl)-naphthalene-1,4,5,8-tetracarboxydiimide to 100 parts of polyethylene telephthalate (PET) obtained in the same procedure as in Comparative Example 1, the thus obtained mixture was well blended in a V-type blender and after vacuum-drying the thus obtained composition, a transparent sheet of 350 μm in thickness was molded from the dried composition in the same manner as in Example 1.

The UV light transmissivity of the thus produced sheet was 0.0% at 370 nm and 0.1% at 380 nm.

EXAMPLE 5

In the same manner as in Example 1 except for adding 30 parts of naphthalene-1,3,5,7-tetracarboxylic acid instead of 25 parts of dianhydride of naphthalene-1,4,5,8-tetracarboxylic acid in Example 1, a transparent polyester composition of a limiting viscosity of 0.67 was obtained. The UV light transmissivity of a film of 350 μm in thickness, which was prepared from the above-mentioned composition was 2.6% at 370 nm and 15.2% at 380 nm. While using the abovementioned polyester composition, plates of 100 mm in length and widt and 2 mm in thickness were injected, however, even after injecting 500 plates, any adhered materials such as white powder were not observed on the thus injected plates.

COMPARATIVE EXAMPLE 2

Into 5 kg of polyethylene terephthalate of the limiting viscosity of 0.78 (made by NIPPON UNIPET Co., Ltd., RT-543 C® RESIN), 5.5 g of 2(2'-hydroxy-3'-t-butyl-5'-methylphenyl)benzotriazole (made by CIBA GEIGY Ltd. TINUVIN 326®) which is a representative commerciallized ultraviolet absorbing agent were blended, and the thus obtained composition was processed in the same manner as in Example 1 to form a sheet of 350 μm in thickness. The UV light transmissivity of the thus obtained sheet was 2.8% at 370 nm and 8.0% at 380 nm. The chart of transmissivity of the sheet is shown in FIG. 2.

When the above-mentioned composition was continuously injected into plates of 100 mm in length and width and 2 mm in thickness in the same manner as in Example 1, a yellow material adhered onto the pointed end of the nozzle of the molding machine, and from the time when 200 plates were injected, a yellow adhering material began to be noticed.

COMPARATIVE EXAMPLE 3

Into 5 kg of the same polyethylene terephthalate resin as in Comparative Example 2, 110 g of 2(2'-hydroxy-5'-methylphenyl)-benzotriazole (made by CIBA GEIGY Ltd. TINUVIN P®) which is a representative commerciallized ultraviolet absorbing agent were dry-blended, and a master batch resin was produced from the thus blended materials under the conditions following those of Example 1.

Into 1 part of the master batch resin, 19 parts of the same polyethylnne terephthalate resin as above were dry-blended, and from the thus obtained blended materials, a sheet of 350 μm in thickness was molded in the same manner as in Example 1.

The UV light transmissivity of the thus molded sheet was 2.2% at 370 nm and 15.8% at 380 nm. The chart of transmissivity of the sheet is shown in FIG. 2.

When the above-mentioned composition was continuously injected into plates of 100 mm in length and width and 2 mm in thickness in the same manner as in Example 1, a yellow material adhered onto the pointed end of the nozzle of the molding machine, and from the time when 200 plates were injected, a yellow adhering material began to be noticed.

EXAMPLES 6 and 7 and COMPARATIVE EXAMPLE 4

Production of the resin compositions and the sheets was carried out in the same manner as in Examples 1 and 4 and Comparative Example 3 except for using dianhydride of naphthalene-1,4,5,8-tetracarboxylic acid, N,N'-bis(α-carboxymethyl)-naphthalene-1,4,5,8-tetracarboxydiimide and TINUVIN P®, which had been respectively used in Examples 1 and 4 and Comparative Example, in the respective increased amounts shown in Table 1. The results are shown in Table 1.

For reference, Table 1 shows the results of Examples 1 to 7 and Comparative Examples 1 to 4 collectively.

TABLE 1

| | Compounds added | Amounts added (parts by weight) | Time of addition | Light transmissivity 370 nm | Light transmissivity 380 nm | Injection |
|---|---|---|---|---|---|---|
| Example 1 | Dianhydride of naphthalene-1,4,5,8-tetracarboxylic acid | 0.14 | polymerization | 2.8 | 15.0 | no white powder |
| Example 2 | N,N'—bis(α-carboxymethyl)-naphthalene-1,4,5,8-tetra-carboxydiimide and | 0.11 | polymerization | 0.0 | 0.1 | no white powder |
| | Naphthalene-2,6-dicarboxylic acid | 0.56 | | | | |
| Example 3 | N,N'—bis(α-carboxymethyl)-naphthalene-1,4,5,8-tetra-carboxydiimide and | 0.11 | polymerization | 0.1 | 0.1 | — |
| | Naphthalene-2,6-dicarboxylic acid + green coloured | 0.56 | | | | |
| Comparative Example 1 | nothing | 0 | — | 68 | 69 | — |
| Example 4 | N,N'—bis(α-carboxymethyl)-naphthalene-1,4,5,8-tetra-carboxydiimide | 0.15 | blending | — | 0.1 | a small amount white powder |
| Example 5 | Naphthalene-1,3,5,7-tetracarboxylic acid | 0.17 | polymerization | 2.6 | 15.2 | no white powder |
| Comparative Example 2 | TINUVIN 326 | 0.11 | blending | 2.8 | 8.0 | yellow adhering material |
| Comparative Example 3 | TINUVIN P | 0.11 | master batch blending | 2.2 | 15.8 | the same as above |
| Example 6 | Dianhydride of naphthalene-1,4,5,8-tetracarboxylic acid | 0.22 | polymerization | 0.0 | 6.1 | no white powder |
| Example 7 | N,N'—bis(α-carboxymethyl-naphthalene-1,4,5,8-tetra-carboxydiimide | 0.22 | polymerization | 0.0 | 0.0 | no white powder |
| Comparative Example 4 | TINUVIN P | 0.20 | master batch blending | 0.8 | 14.5 | yellow adhering material |

What is claimed is:

1. A thermoplastic polyester resin composition, comprising:
a polyethylene terrephthalate and an ultraviolet screening effective amount of at least one compound selected from the group consisting of naphthalene tetracarboxylic acids, acid monoanhyudrides thereof, naphthalene tetracarboxylic acid derivatives in which two of the carboxylic acid groups form an anhydride ring while the reaining two acid groups are ester erivatives, alkyl esters of said naphthalene tetracarboxylic acids and naphthalene-1,4,5,8-tetracarboxydiimides of the formula:

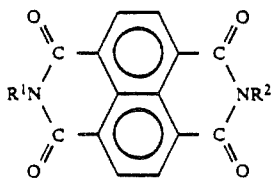

wherein $R^1$ and $R^2$ may be the same or are different from each other and each is a halogen atom, a hydroxyl group, or a lower alkyl group substituted by carboxyl group(s) or hydroxyl group(s).

2. A thermoplastic polyester resin composition according to claim 1, wherein said naphthalenetetracarboxylic acid is naphthalene-1,4,5,8-tetracarboxylic acid, naphthalene1,3,5,7.-tetracarboxylic acid, naphthalene-1,3,6,8-tetracarboxylic acid, naphthalene-1,2,4,5-tetracarboxylic acid, naphthalene 2,3,6,7-tettracarboxylic acid, naphthalene-1,2,5,6-tetracarboxylic acid or naphthalene-1,4,5,7-tetracarboxylic acid.

3. A thermoplastic polyester resin composition according to claim 1, wherein said naphthalene-1,4,5,8-tetracarboxydiimide is N,N'-bis (α-carboxymethyl)-naphthalene-1,4,5,8-tetracarboxydiimide, N,N'-bis(β-carboxyethyl)-naphthalene-1,4,5,8-tetracarboxydiimide or N,N'-bis(β-hydroxyethyl)-naphthalene-1,4,5,8-tetracarboxydiimide.

4. A thermoplastic polyester resin composition according to claim 1, wherein said amount effective in ultraviolet screening of at least one of naphthalenetetracarboxylic acids, acid anhydrides thereof, naphthalene-1,4,5,8-tetracarboxydiimides and alkyl esters thereof is from 0.001 to 20 parts by weight per 100 parts by weight of said polyethylene terephthalate.

5. A thermoplastic polyester resin composition according to claim 4, wherein said amount effective in ultraviolet screening of at least one of naphthalenetetracarboxylic acids, acid anhydrides thereof, naphthalene-1,4,5,8-tetracarboxydiimides and alkyl esters thereof is from 0.005 to 10 parts by weight per 100 parts by weight of said polyethylene terephthalate.

6. A thermoplastic polyester resin composition according to claim 1, which is formed by adding at least one of naphthalenetetracarboxylic acids, anhydrides thereof, naphthalene-1,4,5,8-tetracarboxydiimides and alkyl esters thereof at the time of the polymerization of said polyethylene terephthalate.

7. A thermoplastic polyester resin composition according to claim 1, which is formed by adding at least one of naphthalenetetracarboxylic acids, anhydrides thereof, naphthalene-1,4,5,8-tetracarboxydiimides and esters thereof to said polyethylene terephthalate after polymerization.

8. A container formed from said thermoplastic polyester resin composition of claim 1.

9. A film or sheet formed from said thermoplastic polyester resin composition of claim 1.

10. A bottle formed from said thermoplastic polyester resin composition of claim 1.

11. A thermoplastic polyester resin composition according to claim 1, wherein said compostion further comprises at least one naphthalenedicarboxylic acid or derivatives thereof of formula (II) or formula (III):

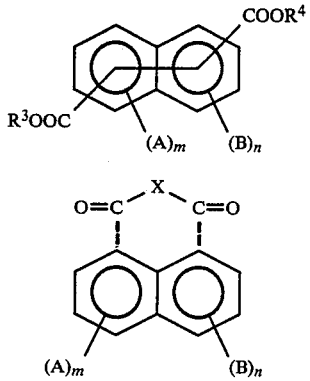

wherein X represents an oxygen atom or the group $NR^5$, wherein $R^5$ is the same as $R^1$ and $R^2$; $R^3$ and $R^4$ may be the same or are different from each other and each is a hydrogen atom, a halogen atom, and alkyl group which may be substituted, an alkenyl group which may be substituted, an aryl group which may be substituted, an aralkyl group which may be sustituted or an alkylaralkyl group which may be substitued; A and B may be the same or are different from each other and each is a halogen atom, a hydroxyl group, an amino group, a nitro group, a cyano group, a sulfonic acid group or a metal salt thereof, a carboxyl group, an alkyl group which may be substituted, and alkoxy group which may be substituted, an alkenyl group which may be substituted, and aryl group which may be substituted, an aralkyl group which may be substituted or an alkylaralkyl group which may be substituted: m and n are each zero or an integer up to 3 and m+n is zero or an integer up to 6, and an acid anhydride group or an imide group of the formula:

$$-C(=O)-X-C(=O)-$$

forms a ring at the 1,8-position, the 2,3-position or the 3,4-position of the naphthalene ring of the formula (III); with the proviso that one of A and B is not a carboxyl group when both m and n are 1, A is not a carboxyl group when m is 2 and n is 0, and B is not a carboxyl group when m is 0 and n is 2, in an amount of not less than 0.001 part by weight per 100 parts by weight of said polyethylene terephthalate.

12. A thernoplastic polyester resin composition according to claim 11, wherein said naphthalenedicarboxylic acid or the derivative thereof represented by the formula (II) or (III) is a compound in which m and n of the formula (II) and (III) are respectively zero; $R^3$ and $R^4$ of the formula (II) are respectively a hydrogen atom or a lower alkyl group; and $R^5$ of the formula (III) is a hydrogen atom, a hydroxyl group or an alkyl group which may be substituted.

13. A thermoplastic polyester resin composition according to claim 12, wherein said naphthalenedicarboxylic acid or a derivative thereof is naphthalene-2,6-dicarboxylic acid, naphthalene-2,7-dicarboxylic acid, naphthalene-2,3-dicarboxylic acid, naphthalene-1,4-dicarboxylic acid or an alkyl ester of one of said naphthalenedicarboxylic acids.

14. A thermoplastic polyester resin composition according to claim 11, wherein said amount of addition of the naphthalenedicarboxylic acid or the derivative thereof is from 0.01 to 10 parts by weight per 100 parts by weight of said polyethylene terephthalate.

* * * * *